UNITED STATES PATENT OFFICE.

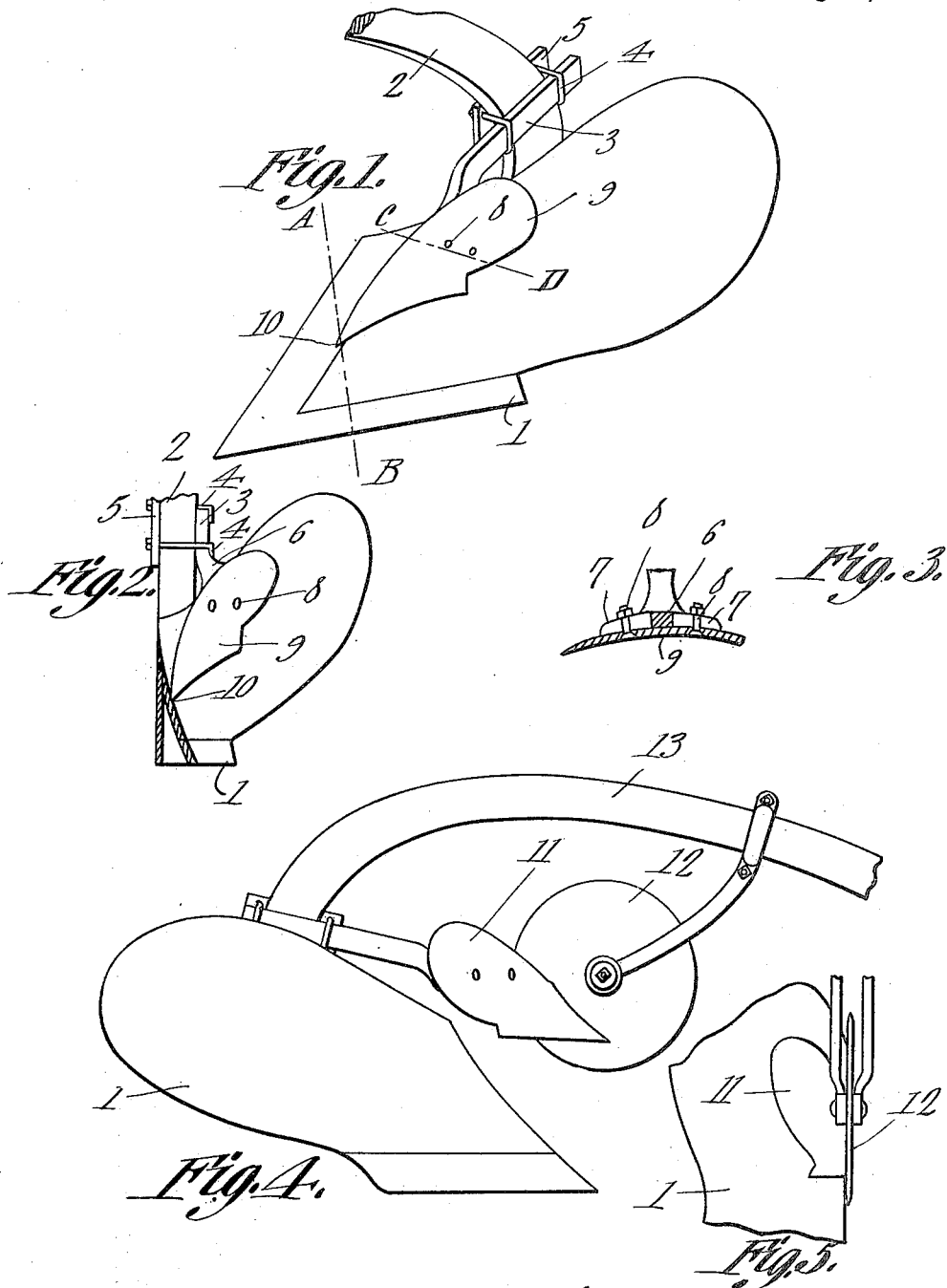

PHILIP S. SIDELL, OF SHREVE, OHIO.

JOINTER ATTACHMENT FOR PLOWS.

1,106,739.  Specification of Letters Patent.  Patented Aug. 11, 1914.

Application filed November 21, 1912. Serial No. 732,741.

*To all whom it may concern:*

Be it known that I, PHILIP S. SIDELL, a citizen of the United States, residing at Shreve, in the county of Wayne and State of Ohio, have invented a new and useful Jointer Attachment for Plows, of which the following is a specification.

This invention relates to jointer attachments for plows and is more particularly designed as an improvement upon the structure shown in Patent No. 946,279, issued to me on January 11, 1910. In structures of this type as heretofore devised, considerable difficulty has been experienced by reason of the fact that trash has accumulated between the plow and the point of the jointer blade thus rendering the device inefficient for the purposes intended. This trouble has been due to the fact that the jointer blade has been spaced a sufficient distance from the plow to admit foreign substances which have become hung thereon. Furthermore, jointer blades as heretofore utilized have been arranged in front of the plow. Consequently, should there be an unyielding obstruction in front of the plow, said obstruction would be hit by the jointer blade. Thus the blade would be injured.

One of the objects of the present invention is to provide a jointer blade which is arranged to contact with one side of the plow, cotter disk, or other soil engaging element at a point back of the front extremity of said element, this jointer blade being so arranged as to engage and cut off the sod on the furrow slice and turning it into the furrow.

Another object is to provide a jointer blade which, by contacting with the side of the soil engaging element, prevents trash from accumulating between said element and jointer blade.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a perspective view of a plow having the present improvements combined therewith the parts being arranged to turn the soil to the left of the plow. Fig. 2 is a section on line A—B Fig. 1. Fig. 3 is a transverse section through the jointer blade and showing the means for connecting it adjustably to its stem, said section being on the line C—D of Fig. 1. Fig. 4 is a side elevation showing a modified arrangement of the jointer blade, the same being combined with a disk colter, the parts being arranged to turn the soil to the right of the plow. Fig. 5 is an end elevation of certain of the parts shown in Fig. 4.

Referring to the figures by characters of reference 1 designates a soil engaging element in the form of an ordinary furrow opening plow having a standard 2. Extending forwardly along one side of the standard 2 and in a substantially horizontal plane, is the arm 3 of the jointer attachment, this arm being held on the standard 2 by U-bolts 4 the ends of which are mounted within a clamping plate 5 mounted on one side of the standard. The front end of the arm 3 is broadened to form a head 6, this head being provided with oppositely extending slotted portions 7 designed to receive bolts 8. These bolts extend backwardly from the blade 9 of the jointer, this blade being preferably in the form of a miniature plow and having one side edge contacting with one side of the plow 1 up to the point 10 of the jointer blade. By mounting the bolts 8 in slots 7, it will be apparent that the jointer blade can be adjusted laterally so as to bring its inner side edge into contact with the side of the plow 1. With the device thus arranged it will be seen that when the plow is drawn forward, the sod will be cut off of the furrow slice by the jointer blade and turned down into the furrow. As the jointer blade contacts with the side of the plow, there is no danger of trash accumulating between the two parts and interfering with the proper operation of the attachment. Furthermore it will be seen that the point of the plow extends forwardly beyond the point 10 of the jointer blade and, therefore, there is no danger of the jointer blade coming into contact with any obstructions which may be in the path of the plow. Instead the plow itself will strike the obstruction and the jointer blade will thus be shielded from injury.

While the jointer attachment is preferably designed for use in connection with a furrow opening plow such as shown in Figs. 1 and 2, it is to be understood that it can be used in connection with other forms of soil engaging devices. For example, and as shown in Fig. 4, the jointer blade 11 can be extended into contact with one side of a colter disk 12 supported from the plow beam 13, the jointer blade in this instance, operating in the same manner as hereinbefore described and having the additional function of a scraper for removing accumulations from the disk.

What is claimed is:—

The combination with a soil engaging device and a standard, of a forwardly extending arm connected to the standard, and a jointer blade mounted on the front end of the arm, said blade contacting along one edge with one side of the soil engaging device.

In testimony that I claim the foregoing as my own, I have hereto affixed my signature in the presence of two witnesses.

PHILIP S. SIDELL.

Witnesses:
M. C. CORNELL,
ARTHUR S. LISLE.

Copies of this patent may be obtained for five cents each, by addressing the "Commissioner of Patents, Washington, D. C."